US012497575B2

(12) United States Patent
Sanchez et al.

(10) Patent No.: US 12,497,575 B2
(45) Date of Patent: Dec. 16, 2025

(54) FABRIC SOFTENING COMPOSITIONS

(71) Applicant: Colgate-Palmolive Company, New York, NY (US)

(72) Inventors: Sandra Paola Sanchez, Mexico D.F. (MX); Raul Arellano Maldonado, Mexico D.F. (MX); Marcela Hernandez, San Jose Iturbide (MX)

(73) Assignee: Colgate-Palmolive Company, New York, NY (US)

(*) Notice: Subject to any disclaimer, the term of this patent is extended or adjusted under 35 U.S.C. 154(b) by 897 days.

(21) Appl. No.: 17/597,622

(22) PCT Filed: Nov. 23, 2021

(86) PCT No.: PCT/US2021/060545
§ 371 (c)(1),
(2) Date: Jan. 18, 2022

(87) PCT Pub. No.: WO2022/115442
PCT Pub. Date: Jun. 2, 2022

(65) Prior Publication Data

US 2023/0340364 A1 Oct. 26, 2023

Related U.S. Application Data

(60) Provisional application No. 63/118,487, filed on Nov. 25, 2020.

(51) Int. Cl.

| | |
|---|---|
| ***C11D 1/62*** | (2006.01) |
| ***C11D 3/20*** | (2006.01) |
| ***C11D 3/36*** | (2006.01) |
| ***C11D 3/37*** | (2006.01) |
| ***C11D 3/48*** | (2006.01) |
| ***C11D 11/00*** | (2006.01) |

(52) U.S. Cl.
CPC .............. *C11D 1/62* (2013.01); *C11D 3/2075* (2013.01); *C11D 3/36* (2013.01); *C11D 3/3769* (2013.01); *C11D 3/48* (2013.01); *C11D 2111/12* (2024.01)

(58) Field of Classification Search
CPC ....... C11D 1/62; C11D 3/3769; C11D 3/2075; C11D 11/0017; C11D 3/36; C11D 3/48
See application file for complete search history.

(56) References Cited

U.S. PATENT DOCUMENTS

| | | | | |
|---|---|---|---|---|
| 6,890,969 B2 * | 5/2005 | Rabasco | C08K 5/31 424/78.37 |
| 7,220,715 B2 | 5/2007 | Ghosh et al. | |
| 9,758,927 B2 * | 9/2017 | Acosta | D06M 15/53 |
| 2003/0162689 A1 * | 8/2003 | Schymitzek | C11D 17/047 510/515 |
| 2006/0123562 A1 * | 6/2006 | Ghosh | D06L 1/04 8/147 |
| 2008/0197315 A1 * | 8/2008 | Schmidt | D06M 15/643 252/8.91 |
| 2009/0124157 A1 * | 5/2009 | Garza | B32B 7/12 156/60 |
| 2014/0208525 A1 * | 7/2014 | Acosta | C11D 3/3707 8/137 |
| 2016/0010029 A1 * | 1/2016 | Murphy | C11D 3/30 510/521 |
| 2018/0230402 A1 * | 8/2018 | Christensen | D06M 13/46 |
| 2020/0224124 A1 * | 7/2020 | Bautista Cid | C11D 3/30 |
| 2022/0195336 A1 * | 6/2022 | Jha | C11D 17/0039 |
| 2023/0340364 A1 * | 10/2023 | Sanchez | C11D 3/001 |

FOREIGN PATENT DOCUMENTS

| | | |
|---|---|---|
| EP | 3677244 | 7/2020 |
| EP | 3677244 A2 * | 7/2020 |
| WO | 2016/049389 | 3/2016 |

OTHER PUBLICATIONS

International Search Report and the Written Opinion of the International Searching Authority issued in International Application PCT/US2021/060545 mailed Feb. 22, 2022.
Anonymous, 2020, "Antimicrobial N2000: the MIT-Free Preservative for Effective Fabric Softeners at Low Concentration and Wide pH Range." Quimidroga, Mar. 16, 2020, www.quimidroga.com/en/2020/03/16/antimicrobial-nh2000-the-mit-free-preservative-for-effective-fabric-softeners-at-low-concentration-and-wide-ph-range/. Accessed Nov. 3, 2020 (Web page screen shot attached).

* cited by examiner

*Primary Examiner* — Mark Eashoo
*Assistant Examiner* — M. Reza Asdjodi

(57) ABSTRACT

Described herein are fabric softening compositions comprising a quaternary ammonium compound (e.g., an esterquat); a cationic polyquaternium polymer (e g., polyquaternium-7); a preservative system which comprises an organic acid (e.g., lactic acid or phosphonic acid); and 3-iodo-2-propynyl butylcarbamate (IPBC) or Dodecylguanidine Hydrochloride (DGH); and a phosphonic chelating agent (e.g., etidronic acid). Methods of making and using the fabric softening compositions are also described herein.

19 Claims, No Drawings

FABRIC SOFTENING COMPOSITIONS

BACKGROUND

Conventional fabric softener compositions are added to the ishing, rinsing, or drying step of the laundry cycle to, for example, soften the laundry and reduce static. Such fabric softeners are often formed of a blend of quaternary ammonium compounds (e.g., salts) or imidazolinium compounds having at least one long chain hydrocarbyl group, and additives designed to optimize the properties of the resulting composition. Quaternary ammonium compounds are known to exhibit particularly good fabric softening performance. Certain commercialized liquid fabric softener products can include esterquats, cationic polymers and fragrance as main ingredients to provide consumer benefits.

However, preservatives also play a vital role in product formulation. Due to the chemical composition of various home care products, those products can be sensitive to broad diversity of microbial contamination. This has long been a significant concern to the industry. Bacteria, yeast or fungus, all cause microbial spoilage, and are extremely diverse in their metabolic activities and pathogenicity. It is often a challenge to be able to formulate a fabric softening product that can deliver consumer benefits, but at the same time also contains an appropriate preservative system that can address the potential issues with bacteria, yeast, or fungus.

Some preservation challenges may occur if some products use ingredients that necessarily lower the overall pH of the product. For example, certain products can use lactic acid and chelating agents that are inherently quite acidic. While the addition of these components can be beneficial, the result is that they can cause the resulting product to have very low pH—e.g., 2 to 3.5. While this can help to control the growth of regular or standard microorganism, the trade-off is that the composition may have lower efficacy in terms the control of growth of acidophilic bacteria. This can be problematic in terms of controlling the number of microorganisms in the formulation. While various preservatives can be used to control acidophilic bacteria, sometimes there can strict legal regulations on the type of preservatives that are allowed in the final formulations.

Accordingly, it is necessary to identify new preservative systems that can be used in fabric softener products that control the growth of acidophilic bacteria but can also comply with the safety regulations and requirements that exist for consumer products such as fabric softeners.

BRIEF SUMMARY

Accordingly, in one aspect, the disclosure provides fabric softener compositions that contain a preservative system comprising iodopropynyl butylcarbamate "IPBC" that can surprisingly achieve effective control of both acidophilic bacteria and standard bacteria. The advantage to using IPBC, other than the broad bacterial protection, is that the preservation system with IPBC does not appear to significantly alter the fabric softener composition and the result is a fabric softener with acceptable stability and appearance. In some aspects, the preservative system may include Dodecylguanidine Hydrochloride "DGH" as an alternative to IPBC.

In one aspect, the fabric softeners contemplated here include a preservative system which can suppress the number of acidophilic bacteria in the composition. In certain embodiments, the preservative system will comprise IPBC, and the IPBC is incorporated as a post-manufacturing additive to the fabric softener composition. In other embodiments, the preservative system will comprise DGH, and the DGH is incorporated as a post-manufacturing additive to the fabric softener composition. In another aspect the IPBC or DGH are added in amounts effective to provide good dispersion into the product while not affecting stability or appearance.

IPBC (3-iodo-2-propynyl butylcarbamate) is an iodine containing compound that has a relatively small effect on the environment and acceptable preservative qualities as an antifungal. However, the primary use has been in coatings, textiles, paper, adhesives and cosmetics. IPBC is composed of an iodine propynyl group and a butylcarbamate group, and has the molecular structure as follows:

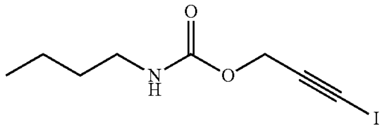

3-iodo-2-propynyl butylcarbamate

DGH (Dodecylguanidinee Hydrochloride), is an effective biocidal and fungicidal agent. DGH, is effective against gram-negative bacteria and other common water contaminating bacteria. Unlike quaternary ammonium compounds, DGH is believed to also be effective against sulfur reducing bacteria. It is stable over a wide pH range and it is often used in compositions with other non-oxidizing biocides to facilitate synergistic effects. Mixtures of quaternary ammonium compounds with DGH also show particularly high activity. DGH is a synthetic compound, and can be effective over a broad pH, while not containing or releasing formaldehyde. DGH is composed of guanidine group and a dodecyl group with a molecular structure as follows:

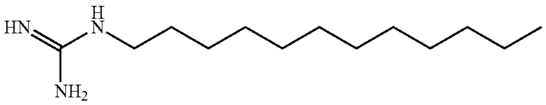

HCl

Dodecylguanidine Hydrochloride

In one aspect the disclosure contemplates a fabric care composition (Composition 1.0). Composition 1.0 is a fabric softening composition comprising:

a. A quaternary ammonium compound (e.g., an esterquat) (e.g., Dialkyl ester of triethanol ammonium methyl sulphate);
b. A cationic polyquaternium polymer (e g., polyquaternium-7);
c. A preservative system comprising:
    i. An organic acid (e.g., lactic acid or phosphonic acid); and
    ii. 3-iodo-2-propynyl butylcarbamate (IPBC) or Dodecylguanidine Hydrochloride (DGH); and
d. A phosphonic chelating agent (e.g., etidronic acid)

In another aspect the fabric softening composition of Composition 1.0 includes the following aspects:

1.1. The fabric softening composition of 1.0, wherein the quaternary ammonium compound is selected from the group consisting of: esterquats, imidazolium quats, difatty diamide ammonium methyl sulfate, ditallow dimethyl ammonium chloride, bis-(2-hydroxypropyl)-dim.ethylammonium metbylsulphate fatty acid ester, 1,2-di(acyloxy)-3-trimethylammoniopropane chloride., N, N-bis(stearoyl-oxy-ethyl) N.N-dimethyl ammonium chloride, N,N-bis(tallowovl-oxy-ethyl) N.N-dimethyl ammonium chloride, N,N-bis(stearoyl-oxy-ethyl)N-(2 hydroxvethyl)N-methyl ammonium methylsulfate., 1,2 di (stearoyl-oxy) 3 trimethyl ammoniumpropane chloride, dicanoladimethylammonium chloride, di(hard)tallowdimethylammonium chloride dicanoladimethylammonium methylsulfate, 1-methyl-1-stearoylamidoethyl-2-stearoylimidazolinium methylsulfate, 1-tallowylamidoemyl-2-tallowylimidazoline, dipalmethyl hydroxyethylammoinum methosulfate and mixtures thereof.

1.2. The fabric softening composition of 1.1 wherein the quaternary ammonium compound is an esterquat.

1.3. The fabric softening composition of 1.2, wherein the esterquat comprises a mixture of monoesterquats, diesterquats, and triesterquats.

1.4. The fabric softening composition of 1.3, wherein the normalized percentage of monoester compound in said esterquat is from 28% to 34%; the normalized percentage of diester compound is from 55% to 62%, and the normalized percentage of triester compound is from 8% to 14%, all percentages being by weight of the total esterquat weight.

1.5. Any of the preceding compositions, wherein the quaternary ammonium compound (e.g., esterquat) is present in an amount 1% by wt. to 5% by wt., relative to the total weight of the composition (e.g., from 2% to 4% by wt., e.g., about 2.7% by wt.)

1.6. Any of the preceding fabric softening compositions, wherein the cationic polyquaternium polymer is selected from: polyquaternium-1, polyquaternium-2, polyquaternium-3, polyquaternium-4, polyquaternium-5, polyquaternium-6, polyquaternium-7, polyquaternium-8, polyquaternium-9, polyquaternium-10, polyquaternium-11, polyquaternium-12, polyquaternium-13, polyquaternium-14, polyquaternium-15, polyquaternium-16, polyquaternium-17, polyquaternium-18, polyquaternium-19, polyquaternium-20, polyquaternium-21, polyquaternium-22, polyquaternium-23, polyquaternium-24, polyquaternium-25, polyquaternium-26, polyquaternium-27, polyquaternium-28, and mixtures thereof.

1.7. The fabric softening composition of 1.6, wherein the cationic polyquaternium compound is polyquaternium-7.

1.8. The fabric softening composition of any of the preceding compositions, wherein the cationic polyquaternium compound (e.g., polyquaternium-7) is present in an amount from 0.1%-0.75% by wt. of the total composition.

1.9. The fabric softening composition of any of 1.8, wherein the cationic polyquaternium compound (e.g., polyquaternium-7) is present in an amount from 0.1%-0.3% by wt. of the total composition (e.g., about 0.36% by wt of the total composition).

1.10. The fabric softener of any of the preceding compositions, wherein the organic acid is selected from lactic acid, etidronic acid, and phosphonic acid 1.11. The fabric softener of 1.10, wherein the organic acid (e.g., lactic acid) is present in an amount from 0.05% to 0.25% by wt. of the total composition (e.g., about 0.11% by wt.)

1.12. The fabric softener of 1.10, wherein the organic acid is lactic acid (e.g., lactic acid from 0.05% to 0.25%).

1.13. The fabric softener of any of the preceding composition, wherein the preservative system comprises lactic acid and 3-iodo-2-propynyl butylcarbamate.

1.14. The fabric softener of 1.13, wherein the ratio of 3-iodo-2-propynyl butylcarbamate:lactic acid is present in a weight ratio of about 2:1, based on the total weight of the composition.

1.15. The fabric softener of 1.14, wherein the 3-iodo-2-propynyl butylcarbamate is present in an amount from 0.1%-1% by wt of the total composition (e.g., 0.15%-0.3% by wt of the total composition) (e.g., about 0.2% by wt of the total composition).

1.16. The fabric softener of any compositions 1.0-1.12, wherein the preservative system comprises lactic acid and Dodecylguanidine hydrochloride (DGH).

1.17. The fabric softener of 1.16, wherein the ratio of Dodecylguanidine hydrochloride (DGH):lactic acid is present in a weight ratio of about 1:1, based on the total weight of the composition.

1.18. The fabric softener of 1.17, wherein the Dodecylguanidine hydrochloride (DGH) is present in an amount from 0.05%-0.5% by wt of the total composition (e.g., 0.05%-0.15% by wt of the total composition) (e.g., about 0.1% by wt of the total composition).

1.19. Any of the preceding compositions, wherein the phosphonic chelating agent is etidronic acid.

1.20. The fabric composition of 1.19, wherein the etidronic acid is present in an amount from 0.05%-0.25% by wt. of the total composition (e.g., about 0.1% by wt of the total composition).

1.21. Any of the preceding compositions, wherein the fabric softener comprises:

i. an esterquat (e.g., Dialkyl ester of triethanol ammonium methyl sulphate) present in an amount 1% by wt. to 15% by wt., relative to the total weight of the composition;

ii. polyquaternium-7 present from 0.1%-0.75% by wt. of the total composition.

iii. A preservative system comprising:

a. lactic acid present in an amount from 0.05% to 0.25% by wt. of the total composition; and b. 3-iodo-2-propynyl butylcarbamate present in an amount from 0.1%-0.5% by wt. of the total composition;

iv. etidronic acid present in an amount from 0.05%-0.25% by wt. of the total composition v. water 1.22. Any of the compositions 1.0-1.20, wherein the fabric softener comprises:

i. an esterquat (e.g., Dialkyl ester of triethanol ammonium methyl sulphate) present in an amount 1% by wt. to 15% by wt., relative to the total weight of the composition;

ii. polyquaternium-7 present from 0.1%-0.75% by wt. of the total composition.

iii. A preservative system comprising:

a. lactic acid present in an amount from 0.05% to 0.25% by wt. of the total composition; and b. Dodecylguanidine hydrochloride (DGH) present in an amount from 0.05%-0.15% by wt. of the total composition;

iv. etidronic acid present in an amount from 0.05%-0.25% by wt. of the total composition v. water 1.23. Any of the preceding compositions, wherein the fabric softener composition comprises a preservative system that comprises lactic acid and 3-iodo-2-propynyl butylcarbamate, and is present in an amount that is effective at reducing or preventing the growth of acidophilic bacteria (e.g., acetic acid bacteria) relative to a control sample which does not contain 3-iodo-2-propynyl butylcarbamate.

1.24. The fabric softener composition of 1.19, wherein the preservative system specifically targets an acetic acid bacterium selected from: *Acetobacter cerevisae, Acetobater aceti, Gluconobacter oxydans, Gluconacetobacter liquefaciens*, and combinations thereof.

In yet another aspect, the disclosure contemplates a method of manufacturing any fabric softeners of Composition 1.0, et seq. In one aspect, the method of manufacturing comprises the post addition of IPBC or DGH into the finished fabric softening product. In this aspect, the preservatives demonstrate acceptable dispersibility when part of a post addition in the manufacturing process.

DETAILED DESCRIPTION

Fabric Softening Agents

In some embodiments, the fabric softening composition of Composition 1.0 et seq, the quaternary ammonium compound comprises a biodegradable fatty acid quaternary ammonium compound known as an esterquat. As used herein, "esterquats" can be quaternary ammonium compounds having two long (C(16)-C(18)) fatty acid chains with 2 weak ester linkages. In some embodiments, the quaternary ammonium compound imparts fabric softening properties to the FS composition. The fabric care composition of Composition 1.0 et seq, includes one or more fabric softening agents. In certain embodiments, the fabric softening agent is a quaternary ammonium compound selected from among esterquats, imidazolium quats, difatty diamide ammonium methyl sulfate, ditallow dimethyl ammonium chloride, bis-(2-hydroxypropyl)-dim.ethylammonium metbylsulphate fatty acid ester, 1,2-di(acyloxy)-3-trimethylammoniopropane chloride., N. N-bis(stearoyl-oxy-ethyl) N.N-dimethyl ammonium chloride, N,N-bis(tallowoyl-oxy-ethyl) N.N-dimethyl ammonium chloride, N,N-bis(stearoyl-oxy-ethyl) N-(2 hydroxyethyi)N-methyl ammonium methylsulfate., 1,2 di (stearoyl-oxy) 3 trimethyl ammoniumpropane chloride, dicanoladimethylammonium chloride, di(hard)tallowdimethylammonium chloride dicanoladimethylammonium methylsulfate, 1-methyl-1-stearoylamidoethvl-2-stearoylimidazolinium methylsulfate, 1-tallowylamidoemyl-2-tallowylimidazoline, dipalmethyl hydroxyethylammoinum methosulfate and mixtures thereof.

In some embodiments, the quaternary ammonium compound is derived from the reaction of an alkanol amine and a fatty acid derivative, followed by quaternization (complete or partial) of the product. In some embodiments, the quaternary ammonium compound is a dialkyl ester of triethanol ammonium methyl sulphate. In some embodiments, the quaternary ammonium compound comprises a compound having the structure of formula I:

I

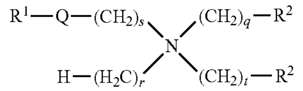

wherein:

Q is a carboxyl group having the structure selected from —OCO—; and —COO;

$R^1$ is an aliphatic hydrocarbon group having from 8 to 22 carbon atoms, preferably a $C_{10}$ to $C_{20}$ alkyl group;

$R^2$ is selected from Q-$R^1$ and —OH;

q, r, s, t each independently represent a number from 1 to 3; and $X^{-a}$ is an anion having a valence "a". Preferred anion materials include chloride, bromide, and methyl sulfate.

In some embodiments, the present disclosure provides a quaternary ammonium compound of formula I, wherein one of the $R^2$ groups is Q-$R^1$. Further embodiments provide a quaternary ammonium compound of formula I, wherein both $R^2$ groups are Q-$R^1$. Still further embodiments provide a quaternary compound of formula I, wherein both $R^2$ groups are —OH.

In some embodiments, the quaternary ammonium compound comprises a mixture of monoesters, diesters, and triesters. In some embodiments, the normalized percentage of monoester compound in said quaternary ammonium compound is from 28% to 34%; the normalized percentage of diester compound is from 55% to 62%, and the normalized percentage of triester compound is from 8% to 14%, all percentages being by weight.

In some embodiments, the quaternary ammonium compound is an oligomeric esterquat, obtainable by reaction of an alkanol amine with (i) a polycarboxylic acid; and (ii) a fatty alcohol or a fatty acid or a mixture of fatty alcohols and fatty acids, followed by partial quaternization, thereby forming a mixture of oligomeric ester amines and esterquat. In some embodiments, the alkanol amine is triethanol amine. In some embodiments, the carboxylic acid is a polycarboxylic acid. In other embodiments the carboxylic acid is a dicarboxylic acid. An example of such an esterquat material is the esterquats commercially available from Kao Chemicals or Stepan Company.

In certain aspects, the reaction products are 50-65 weight % diesterquat, 20-40 weight % monoester, and 25 weight % or less trimester. In other embodiments, the amount of diesterquat is 52-60, 53-58, or 53-55 weight %. In other embodiments, the amount of monoesterquat is 30-40 or 35-40 weight %. In other embodiments, the amount of triesterquat is 1-12 or 8-1 1 weight %.

The percentages, by weight, of mono, di, and tri esterquats, as described above are determined by the quantitative analytical method described in the publication "Characterisation of quatemized triethanoiamine esters (esterquats) by HPLC, HRCGC and NMR" A. J. Wilkes, C. Jacobs, G. Walraven and J. M. Talbot—Colgate Palmolive R&D Inc.—$4^{th}$ world Surfactants Congress, Barceione, 3-7 VI 1996, page 382, which is incorporated herein by reference. The percentages, by weight, of the mono, di and tri esterquats measured on dried samples are normalized on the basis of 100%. The normalization is required due to the presence of 10% to 15%, by weight, of non-quaternized species, such as ester amines and free fatty acids. Accordingly, the normalized weight percentages refer to the pure esterquat component of the raw material. In other words, for the weight % of each of monoesterquat, diesterquat, and triesterquat, the weight % is based on the total amount of monoesterquat, diesterquat, and triesterquat in the composition.

In certain embodiments, the percentage of saturated fatty acids based on the total weight of fatty acids is 45 to 75%. Esterquat compositions using this percentage of saturated fatty acids do not suffer from the processing drawbacks of 100% saturated materials. When used in fabric softening, these compositions provide good consumer perceived fabric softness while retaining good fragrance delivery. In other embodiments, the amount is at least 50, 55, 60, 65 or 70 up to 75%. In other embodiments, the amount is no more than 70, 65, 60, 55, or 50 down to 45%. In other embodiments, the amount is 50 to 70%, 55 to 65%, or 57.5 to 67.5% In one embodiment, the percentage of the fatty acid chains that are saturated is about 62.5% by weight of the fatty acid. In this embodiment, this can be obtained from a 50:50 ratio of hard fatty acid:soft fatty acid.

By hard fatty acid, it is meant that the fatty acid is close to full hydrogenation. In certain embodiments, a fully hydrogenated fatty acid has an iodine value of 10 or less. By soft, it is meant that the fatty acid is no more than partially hydrogenated. In certain embodiments, a no more than partially hydrogenated fatty acid has an iodine value of at least 40. In certain embodiments, a partially hydrogenated fatty acid has an iodine value of 40 to 55. The iodine value can be measured by ASTM D5554-95 (2006). In certain embodiments, a ratio of hard fatty acid to soft fatty acid is 70:30 to 40:60, In other embodiments, the ratio is 60:40 to 40:60 or 55:45 to 45:55. In one embodiment, the ratio is about 50:50. Because in these specific embodiments, each of the hard fatty acid and soft fatty acid cover ranges for different levels of saturation (hydrogenation), the actual percentage of fatty acids that are fully saturated can vary.

The fatty acids can be any fatty acid that is used for manufacturing esterquats for fabric softening. Examples of fatty acids include, but are not limited to, coconut oil, palm oil, tallow, rapeseed oil, fish oil, or chemically synthesized fatty acids. In certain embodiments, the fatty acid is tallow. For example, the esterquat may be a hydrogenated tallow esterquat, such as TETRANYL L1/90 or TETRANYL L2/92, available commercially from Kao chemicals, Tokyo, Japan, or STEPANTEX HS90.

While the esterquat can be provided in solid form, it can also be present in a solvent in liquid form. In solid form, the esterquat can be delivered from a dryer sheet in the laundry. In certain embodiments, the solvent comprises water. In one aspect, esterquats may be considered a cationic surfactant. In some embodiments, the fabric care composition is substantially free of surfactants other than the fabric softening agent. For example, the fabric care composition is substantially free of surfactants other than esterquat. In some embodiments, the fabric care composition is substantially free of detersive surfactants. In another embodiment, the fabric care composition is substantially free of anionic surfactants.

AI refers to the active weight of the combined amounts for monoesterquat, diesterquat, and triesterquat. Delivered AI refers to the mass (in grams) of esterquat used in a laundry load. A load is 3.5 kilograms of fabric in weight. As the size of a load changes, for example using a smaller or larger size load in a ishing machine, the delivered AI adjusts proportionally. In certain embodiments, the delivered AI is 2.8 to 8 grams per load. In other embodiments, the delivered AI is 2.8 to 7, 2, 8 to 6, 2, 8 to 5, 3 to 8, 3 to 7, 3 to 6, 3 to 5, 4 to 8, 4 to 7, 4 to 6, or 4 to 5 grams per load.

Cationic Polymer

In some aspects, any of Composition 1.0 el seq can contain a cationic polymer. The cationic polymers of the present disclosure can be amine salts or quaternary ammonium salts, e.g., polyquatemium polymers. Preferred are quaternary ammonium salts. They include cationic derivatives of natural polymers such as some polysaccharide, gums (e.g., cationic guar gums), starch and certain cationic synthetic polymers such as polymers and co-polymers of cationic vinyl pyridine or vinyl pyridinium halides.

In some aspects the polymers are water soluble, for instance to the extent of at least 0.5% by weight at 20° C. Preferably they have molecular weights of from about 600 to about 1,000,000, more preferably from about 600 to about 500,000, even more preferably from about 800 to about 300,000, and especially from about 1000 to 10,000. As a general rule, the lower the molecular weight the higher the degree of substitution (D.S.) by cationic, usually quaternary groups, which is desirable, or, correspondingly, the lower the degree of substitution the higher the molecular weight which is desirable, but no precise relationship appears to exist. In general, the cationic polymers should have a charge density of at least about 0.01 meq/gm., preferably from about 0.1 to about 8 meq/gm., more preferably from about 0.5 to about 7, and even more preferably from about 2 to about 6. Suitable desirable cationic polymers are disclosed in "CTFA International Cosmetic Ingredient Dictionary", Fourth Edition, J. M. Nikitakis, et al, Editors, published by the Cosmetic, Toiletry, and Fragrance Association, 1991, incorporated herein by reference. In one aspect, the fabric softener composition of Composition 1.0 et seq can include a polyquaternium compound selected from: polyquaternium-1, polyquaternium-2, polyquaternium-3, polyquaternium-4, polyquaternium-5, polyquaternium-6, polyquaternium-7, polyquaternium-8, polyquaternium-9, polyquaternium-10, polyquaternium-11, polyquaternium-12, polyquaternium-13, polyquaternium-14, polyquaternium-15, polyquaternium-16, polyquaternium-17, polyquaternium-18, polyquaternium-19, polyquaternium-20, polyquaternium-21, polyquaternium-22, polyquaternium-23, polyquaternium-24, polyquaternium-25, polyquaternium-26, polyquaternium-27, and polyquaternium-28.

In one aspect, the cationic polymer is a co-softening agent. The co-softening agent may be a polyquaternium polymer, e.g., a cationic polyquaternium polymer. According to one embodiment, the co-softening agent is a stable, water-soluble, and liquid polyquaternium polymer. In one aspect, for example, the co-softening agent may be polyquaternium-7. Polyquaternium-7 has a CAS Number: 26590-05-6, and the empirical formula. $(C8H16NC3H5NOCl)x$. The polyquaternium-7 is the polymeric quaternary ammonium salt consisting of acrylamide and dimethyl diallyl ammonium chloride monomers. Polyquatemium-7 is available commercially as NOVERITE 300 from Lubrizol Corporation, Wickliffe, Ohio, and as FLOCARE L.S737, from SNF Floerger, Andrezieux, France.

In one embodiment, the fabric care composition includes up to 0.30 weight % co-softening agent (e g., polyquaternium-7), based on the total weight of the fabric care composition. In other embodiments, the fabric care composition includes from 0.05 weight % to 0.25 weight % co-softening agent or from 0.05 weight % to 0.20 weight % co-softening agent. For example, the fabric care composition may include from 0.5 weight % to 0.25 weight % polyquatemium-7.

In another embodiment, the amount of co-softening agent in the fabric care composition may be determined by the amount of fabric softening agent to be replaced. That is, the inventors have surprisingly discovered a method of reducing the fabric softening agent (e.g, esterquat) content of a known fabric care composition with established performance characteristics (e.g., softness, fragrance delivery, ease of ironing, wrinkly reducing, dispersion, etc.) by substitution with a co-softening agent (e.g., PQ7) while maintaining similar or superior performance characteristics.

Chelating Agents

In some aspects, any of Composition 1.0 et seq can contain a chelating agent. Chelating agents, or 'sequestering agents', are molecules capable of forming stable complexes with metal ions. In hard water, calcium and magnesium ions are thus inactivated, and the water is effectively softened. The fabric care composition of 1.0 et seq can include any selected from: a phosphonic chelating agent (e.g., etidronic acid (1-hydroxyethylidene-1,1-diphosphonic acid)), citric acid (CA), EDTA, hydroxyamino-polycarboxylic acid (HACA), diethylenetriamine pentaacetic acid (DTPA), hydroxy ethylenediaminetriacetic acid (HEDTA), tetrakis hydroxymethyl phosphonium sulfate (THPS), nitrilotri-acetic acid (NTA), and glutamic acid-diacetic acid (GLDA).

Water

The fabric care composition of Composition 1.0 et seq may include an aqueous carrier. For example, the fabric care composition may include water as the carrier. In certain embodiments, the amount of water is at least 30%, 40%, 50%, 60%, 70%, 80%, or 85% by weight of the composition. In one embodiment, the fabric care composition includes 25 weight % or more water, based on the total weight of the fabric care composition. In other embodiments, the fabric care composition includes 50 weight % or more water or 75 weight % or more water, based on the total weight of the fabric care composition.

In some embodiments, the fabric care composition may be a low-water or "concentrated" formulation intended to be diluted before use. In such embodiments, the fabric care composition includes lower amounts of the aqueous carrier. In certain embodiments, the amount of water is no more than 50%, 40%, 30%, 20%, 15%, or 10% by weight of the composition. For example, the fabric care composition may include 50 weight % or less water or 30 weight % or less water, based on the total weight of the fabric care composition.

The fabric care composition may also include other components commonly used in fabric care compositions in minor amounts to enhance either the appearance or performance of the fabric care compositions. For example, the fabric care composition may include thickeners, fragrances, preservatives, colorants such as dyes or pigments, bluing agents, germicides, and opacifying agents.

In some embodiments, the fabric care composition must be easily pourable by an end user. Accordingly, the viscosity of the fabric care composition should not exceed 500 centipois (cP) for ready-to-use fabric care compositions, preferably not more than 250 cP, and 10,000 cP for fabric care composition intended for dilution before use. In one embodiment, the fabric care composition has a pour viscosity from 30 to 500 cP, or from 50 to 200 cP, Unless otherwise specified, viscosity is measured at 25° C. using a Brookfield RVTD Digital Viscometer with Spindle #2 at 50 rpm.

Polymers

In some embodiments, the fabric softener of Composition 1.0 et seq can comprise contain a polyethylene glycol polymer or a polyethylene glycol alkyl ether polymer. In some embodiments, the polyethylene glycol polymer or polyethylene glycol alkyl ether polymer prevents gelation of the composition. The polyethylene glycol polymers as used herein, have a molecular weight of at least about 200, up to a molecular weight of about 8,000. Useful polymers include, but are not limited to, the polyethylene glycol methyl ether polymers marketed by Aldrich Chemical Company. Useful amounts of polymer in the compositions range from about 0.1% to about 5% by weight. A range about 0.5% to about 1.5% by weight is preferred.

Thickeners

In order to adjust the viscosity, the fabric care composition of Composition 1.0 et seq may include one or more thickeners. The one or more thickeners may include cationic polymeric thickeners that are water soluble and with a high molecular weight. For example, the thickener can be a cross-linked cationic polymer such as FLOSOFT DP200. FLOSOFT DP200 is commercially available from SNF Floerger, and is described in U.S. Pat. No. 6,864,223 to Smith et ai. FLOSOFT DP200 is a water soluble cross-linked cationic polymer derived from the polymerization of from 5 to 100 mole percent of cationic vinyl addition monomer, from 0 to 95 mole percent of acrylamide, and from 70 to 300 ppm of a difunctional vinyl addition monomer cross-linking agent.

Other suitable thickener are water-soluble cross-linked cationic vinyl polymers which are cross-linked using a cross-linking agent of a difunctional vinyl addition monomer at a level of from 70 to 300 ppm, preferably from 75 to 200 ppm, and most preferably of from 80 to 150 ppm. Generally, such polymers are prepared as water-in-oil emulsions, wherein the cross-linked polymers are dispersed in mineral oil, which may contain surfactants. During finished product making, in contact with the water phase, the emulsion inverts, allowing the water soluble polymer to swell. The most preferred thickener may be a cross-linked copolymer of a quaternary ammonium acetate or methacrylate in combination with an acrylamide comonomer. The thickener may provide the fabric care composition long term stability upon storage and allows the presence of relatively high levels of electrolytes without affecting the composition stability. Additionally, the fabric care compositions remain stable when shear is applied thereto. In certain embodiments, the amount of this thickening polymer is at least 0.001 weight %. In other embodiments, the amount is 0,001 to 0.35 weight %.

In some aspects, the fabric softener composition of Composition 1.0 et seq, may also comprise cationic polymers as a thickener, such as copolymers of acrylamide and quaternary ammonium acrylate, and the like. In some aspects, only minor amounts, up to about 1%, preferably up to about 0.8%, such as, for example, about 0.1% to about 0.6%, by weight, provide acceptable viscosity levels over time.

In one embodiment, the fabric care composition includes 0.5 weight % or less thickener, based on the total weight of the fabric care composition. In other embodiments, the fabric care composition includes 0.1 weight % or less thickener or 0.05 weight % or less thickener, based on the total weight of the fabric care composition Fragrances and Colors In one aspect, Composition 1.0 et seq may include one or more fragrances, fragrance oils, or perfumes. As used herein, the term "fragrance" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced odoriferous substances. As used herein, fragrance, or perfume, refers to odoriferous materials that are able to provide a desirable fragrance to fabrics, and encompasses conventional materials commonly used in detergent compositions to provide a pleasing fragrance and/or to counteract a malodor. The fragrances are generally in the liquid state at ambient temperature, although solid fragrances can also be used. Fragrance materials include, but are not limited to, such materials as aldehydes, ketones, esters and the like that are conventionally employed to impart a pleasing fragrance to laundry compositions. Naturally occurring plant and animal oils are also commonly used as components of fragrances.

Composition 1.0, et seq can also include a perfume. As used herein, the term "perfume" is used in its ordinary sense to refer to and include any non-water soluble substance or a mixture of substances, including natural (i.e., obtained by extraction of flowers, herbs, blossoms, or plants), artificial (i.e., mixtures of natural oils or oil constituents), and synthetically produced odoriferous substances. Typically, perfumes are complex mixtures or blends of various organic compounds, such as alcohols, aldehydes, ethers, aromatic compounds, and varying amounts of essential oils (e.g., terpines), the essential oils themselves being volatile, odoriferous compounds, and also serving to dissolve the other components of the perfume.

The fabric care composition may include free fragrances, encapsulated fragrances, or a mixture of both.

In other embodiments, the fabric care composition may be provided as a fragrance-free composition. The amount of fragrance can be any desired amount depending on the preference of the user. In certain embodiments, the total amount of fragrance is from 0.3 weight % to 3 weight % based on the total weight of the fabric care composition. The fragrance can be in free form, encapsulated, or both.

Preservatives

In addition to lactic acid and either IPBC or DGH, the preservative system of the fabric care composition of Composition 1.0 et seq may further comprises one or more organic acids, such as lactic acid or phosphonic acid. For example, the fabric care composition may include a preservative system comprising combinations of food grade lactic acid and amino trimethyl phosphonic acid. In certain embodiments, the fabric care composition may also further include isothiazolinones as preservatives. For example, the one or more preservatives may include a (OIT/MIT/CIT) isothiazolinone mixture. Suitable isothiazolinone preservatives include the isothiazolinones sold under the trademark KATHON DP3 and available from Rohm & Haas, In one embodiment, the fabric care composition of Composition 1.0, et seq, includes 0.005-0.5%, e.g., 0.35 weight % or less, of the preservative system, based on the total weight of the fabric care composition. In other embodiments, the fabric care composition includes 0.15 weight % or less preservative or 0.10 weight % or less preservative, based on the total weight of the fabric care composition.

In some embodiments, the present disclosure provides methods of softening a fabric comprising applying an effective amount of a composition as described herein to a fabric. In some embodiments, the method further comprises the step of rising the fabric to which the composition is applied.

The disclosure will now be described in conjunction with the following, non-limiting examples. Unless stated otherwise, all percentages of composition components given in this specification are by weight based on a total composition or formulation weight of 100%.

It is understood that, in certain cases, an ingredient may perform multiple functions.

The compositions and formulations as provided herein are described and claimed with reference to their ingredients, as is usual in the art. As would be evident to one skilled in the art, the ingredients may in some instances react with one another, so that the true composition of the final formulation may not correspond exactly to the ingredients listed. Thus, it should be understood that the disclosure extends to the product of the combination of the listed ingredients.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

EXAMPLES

Example 1

Preparation of fabric softener samples.

The following process is used to prepare the reference product (negative control) to be used for the post-addition and preparation of the control sample (positive control) and also for the samples with the alternative preservatives (Test composition 1 and Test composition 2).

For 90 kg batch, initial 20% of water is heated to 47.7° C., the agitation is set to 32.5 Hz, then color (1 min of agitation), lactic acid (1 min of agitation), etidronic acid (1 min of agitation) and PQ7 (3 min of agitation) is added. Afterward, the pre-heated esterquat at 60-65° C. is added for 10 seconds and mixture for 5 min. After esterquat addition, the 75% of the remaining water (15° C.) is added and mixed for 5 min more. The final composition is completed with the addition of the rest of the components keeping the agitation at 35 Hz; thickener (10 min of agitation), blend of slurry fragrance capsules (water/capsules; 10:1) (5 min of agitation) and oil perfume (10 min of agitation). For the reference sample, 5% of additional water is post-added to the mixture (5 min of agitation). In the case of the control sample, 0.02% of DPIII is post added with the remaining water to cover the % of hole (5 min of agitation). For the alternative test compositions with IPBC, IPBC is post-added at 0.2% as is. For the test compositions with GDH, GDH is post-added at 0.1%, for both samples a remaining water to cover the remaining hole also is added, using 5 min of additional agitation. The composition of the prepared samples is shown in the Table 1.

TABLE 1

| Ingredient | Negative Control | Positive Control | Test Composition 1 | Test Composition 2 |
|---|---|---|---|---|
| Esterquat | 2.72 | 2.72 | 2.72 | 2.72 |
| Lactic acid | 0.11 | 0.11 | 0.11 | 0.11 |
| Etidronic acid | 0.1 | 0.1 | 0.1 | 0.1 |
| Color, Oil Fragrance, Fragrance capsules | 0.261 | 0.261 | 0.261 | 0.261 |
| Polyquaternium 7 | 0.37 | 0.37 | 0.37 | 0.37 |
| Thickener | 0.31 | 0.31 | 0.31 | 0.31 |
| (OIT/MIT/CIT) isothiazolinone mixture | 0 | 0.02 | 0 | 0 |
| DGH | 0 | 0 | 0.1 | 0 |
| IPBC | 0 | 0 | 0 | 0.2 |
| Water | To balance (e.g., about 96% by wt.) | To balance (e.g., about 96% by wt.) | To balance (e.g., about 96% by wt.) | To balance (e.g., about 96% by wt.) |

* All amounts shown in Table 1 are by wt % of the total composition.

Example 2

The negative control, positive control, Test composition 1, and Test composition 2, described in Table 1 of Example 1 are first evaluated for their dispersibility into the product and their impact on the viscosity, pH and stability (predictive methods). Table 2 below demonstrates the comparison of the properties of the product after making. No significant difference in viscosity, pH and stability are identified for all the evaluated samples. This indicates that IPBC and DGH do not appear to have a negative impact on the characteristics of the final product. IPBC and DGH are also believed to demonstrate acceptable dispersibility by being directly post-added into the finished product.

| Sample | Dispersibility | Viscosity after making (25° C.) (cps) | pH after making (25°) | Separation Speed* (μm/sec) | Yield Stress (Pa)** | Appearance |
|---|---|---|---|---|---|---|
| Negative Control | Accepted | 138 | 2.31 | 0.0074 | 0.0875 | Accepted |
| Positive Control | Accepted | 136 | 2.32 | 0.0074 | 0.0814 | Accepted |
| Test Comp. 1 | Accepted | 136 | 2.31 | 0.0058 | 0.0881 | Accepted |
| Test Comp. 2 | Accepted | 138 | 2.28 | 0.2079 | 0.0859 | Accepted |

*Defined value limit for Separation Speed to obtain good probability of success over the traditional aging test < 1.0 μm/sec.
**Defined value limit for Yield Stress to obtain good probability of success over the traditional aging test > 0.08 Pa.

Example 3

IPBC and DGH are not believed to appear to have a negative impact on the properties of the finished product and can be easily dispersed. A new set of samples are prepared in order to evaluate their microbial effectiveness against acidophilic bacteria in fresh (after making) and with aged samples (8 weeks/40° C.). The samples are prepared as described in Table 1 of Example 1 above.

The stability of the samples is evaluated by predictive methods with fresh samples (separation speed and yield stress) and also following the traditional aging test (13 weeks at 5, 25 and 30° C.). Table 3 shows the viscosity, pH, solids and predictive stability data after sample preparation. The results appear to indicate that samples with IPBC or DGH have similar properties to the negative and positive control samples.

TABLE 3

| Sample | Viscosity after making (25° C.) (cps) | pH after making (25°) | Separation Speed* (μm/sec) | Yield Stress (Pa)** | Appearance |
|---|---|---|---|---|---|
| Negative Control | 140 | 2.88 | 0.0073 | 0.1362 | Accepted |
| Positive Control | 138 | 2.85 | 0.0074 | 0.1251 | Accepted |
| Test Comp. 1 | 139 | 2.87 | 0.0068 | 0.1334 | Accepted |
| Test Comp. 2 | 140 | 2.89 | 0.2737 | 0.1318 | Accepted |

*Defined value limit for Separation Speed to obtain good probability of success over the traditional aging test <1.0 μm/sec
**Defined value limit for Yield stress to obtain good probability of success over the traditional aging test >0.08 Pa The results of the micro-challenge test against acidophilic bacteria for fresh samples are shown in Table 4 below. For acceptance criteria acidophilic bacteria must show a 3.0 Log reduction of the inoculum as determined on day 7 following each inoculation. As well, there can be no increase after day 7 of the second inoculation. The results indicate that the negative control is not achieving the acceptance criteria with a Log reduction below to 3.0. Also test composition 1 which includes GDH does not appear to achieving the Log reduction criteria, and demonstrates low effectiveness against acidophilic bacteria relative to the results seen in test composition 2 which includes IPBC. The preservative system in Test Composition 2 demonstrates acceptable effectiveness against acidophilic bacteria and complies with the Log reduction criteria being up to 3.0. The preservative system in Test Composition 2 demonstrates similar efficacy and similar results the positive control which contains a blend of isothiazolinones as part of its preservative system. This is advantageous given that IPBC is acceptable from a regulatory perspective, does not appear to alter the characteristics of the final product, and surprisingly demonstrates acceptable efficacy against acidophilic bacteria

TABLE 4

| Log Reduction against acidophilic bacteria in fresh samples | | | | | |
|---|---|---|---|---|---|
| Composition | Day 7 | Day 14 | Day 21 | Day 28 | Day 35 |
| Negative Control | 1.2 | 1.5 | 2.3 | 2.5 | 1.4 |
| Positive Control | 5.1 | 5.2 | 5.2 | 5.2 | 5.2 |
| Test Comp. 1 | 1.3 | 1.6 | 2.7 | 5.2 | 5.2 |
| Test Comp. 2 | 5.1 | 5.2 | 5.2 | 5.2 | 5.2 |

The effectiveness against acidophilic bacteria for aged samples also is evaluated in Table 5a below. Similar results to the results obtained for fresh samples is observed for the aged samples. The positive control and Test Composition 2 demonstrated acceptable Log reduction criteria (>3.0). These results support that conclusion that preservative systems with IPBC (e.g., Test Composition 2, as described in Table 1, Example 1 above) can be good candidate to improve the robustness of fabric softener formulas against acidophilic bacteria.

TABLE 5a

| Log Reduction against acidophilic bacteria in aged samples | | | | | |
|---|---|---|---|---|---|
| Composition | Day 7 | Day 14 | Day 21 | Day 28 | Day 35 |
| Negative Control | 2.9 | 1.3 | 2.1 | 5.0 | 5.0 |
| Positive Control | 4.9 | 5 | 5.0 | 5.0 | 5.0 |
| Test Comp. 1 | 2.3 | 1.4 | 2.6 | 2.5 | 2.6 |
| Test Comp. 2 | 4.9 | 5 | 5.0 | 5.0 | 5 |

In a separate assay, the negative control, positive control, and Test Compositions 1 and 2 are expected to demonstrate the ability to prevent the growth a standard set of microorganisms (*Staphylococcus aureus, Escherichia coli, Pseudomonas aeruginosa, Pseudomonas putida, Enterobacter gergoviae, Aspergillus niger, Candida albicans*).

In a separate assay, the negative control, positive control, and Test Compositions 1 and 2 are tested for their ability prevent or reduce the role of acetic acid bacteria. In this assay, the negative control is expected to show insufficient ability to prevent the growth of acetic acid bacteria. Test Composition 1 is expected to show only "moderate" ability to prevent the growth of acetic acid bacteria. However, the Positive Control and Test Composition 2 are both expected to demonstrate the ability to prevent the growth of acetic acid bacteria after inoculation. The acetic acid bacteria are: *Acetobacter cerevisae, Acetobater aceti, Gluconobacter oxydans, Gluconacetobacter liquefaciens.*

Example 4

In a separate assay, the preservative systems in Test Composition 1 and Test Composition 2 are not believed to affect the properties of the finished product over the aging test (Table 6 and 7). Similar profile of viscosity and pH is observed for all the samples evaluated (i.e., controls and Test Composition 1 and 2). The compositions tested here have the composition as described in Table 1 of Example 1 above:

TABLE 6

| Viscosity Results of aged samples: | | | | | | | | | | |
|---|---|---|---|---|---|---|---|---|---|---|
| Sample | 0 wk | 4 wk | | | 8 wk | | | 13 wk | | |
| Description | RT | 4° C. | 30° C. | 40° C. | 4° C. | 30° C. | 40° C. | 4° C. | 30° C. | 40° C. |
| Test Comp. 1 | 139 | 145.6 | 144.8 | 141.6 | 144 | 148 | 146.4 | 150.4 | 145.6 | 228 |
| Test Comp. 2 | 140 | 148 | 151.2 | 153.6 | 163.2 | 156 | 146.4 | 152.8 | 160 | 248.8 |
| Positive Control | 138 | 144.8 | 146.4 | 145.6 | 144.8 | 146.4 | 146.4 | 148 | 148 | 226.4 |
| Negative Control | 140 | 149.6 | 150.4 | 147.2 | 148 | 152.8 | 151.2 | 152 | 152 | 232.8 |

TABLE 7

| pH Results of aged samples: | | | | | | | | | | |
|---|---|---|---|---|---|---|---|---|---|---|
| Sample | 0 wk | 4 wk | | | 8 wk | | | 13 wk | | |
| Description | RT | 4° C. | 30° C. | 40° C. | 4° C. | 30° C. | 40° C. | 4° C. | 30° C. | 40° C. |
| Test Comp. 1 | 2.33 | 2.3 | 2.3 | 2.3 | 2.2 | 2.2 | 2.2 | 2.3 | 2.3 | 2.2 |
| Test Comp. 2 | 2.32 | 2.3 | 2.3 | 2.3 | 2.2 | 2.2 | 2.2 | 2.3 | 2.3 | 2.2 |
| Positive Control | 2.3 | 2.3 | 2.3 | 2.3 | 2 | 2 | 2.1 | 2.3 | 2.4 | 2.3 |
| Negative Control | 2.29 | 2.3 | 2.3 | 2.3 | 2 | 2 | 2 | 2.3 | 2.3 | 2.2 |

What is claimed is:

1. A fabric softening composition comprising:

a. a quaternary ammonium compound present in an amount 1% by wt. to 5% by wt. of the total composition;

b. a cationic polyquaternium polymer present in an amount from 0.1% to 0.75% by wt. of the total composition;

c. a preservative system comprising:

i. lactic acid present in amount from 0.05% to 0.25% by wt. of the total composition; and ii. 3-iodo-2-propynyl butylcarbamate (IPBC) present in an amount from 0.1% to 0.5% by wt. of the total composition or Dodecylguanidine Hydrochloride (DGH) present in an amount from 0.05% to 0.15% by wt. of the total composition;

wherein the weight ratio of Dodecylguanidine Hydrochloride (DGH): lactic acid is from 1:1 to 1:1.1 or ratio of 3-iodo-2-propynyl butylcarbamate (IPBC): lactic acid is from 2:1 to 2:1.1; and d. a phosphonic chelating agent;

wherein the preservative system effectively controls both acidophilic bacteria and standard bacteria but does not alter stability and appearance of the fabric softening composition.

2. The fabric softening composition of claim 1, wherein the quaternary ammonium compound is selected from the group consisting of: esterquats, imidazolium quats, difatty diamide ammonium methyl sulfate, ditallow dimethyl ammonium chloride, bis-(2-hydroxypropyl)-dimethylammonium metbylsulphate fatty acid ester, 1,2-di(acyloxy)-3-trimethylammoniopropane chloride, N, N-bis(stearoyl-oxy-ethyl) N,N-dimethyl ammonium chloride, N, N-bis (tallowoyl-oxy-ethyl) N, N-dimethyl ammonium chloride, N,N-bis(stearoyl-oxy-ethyl) N-(2 hydroxyethyl) N-methyl ammonium methylsulfate, 1,2 di (stearoyl-oxy) 3 trimethyl ammoniumpropane chloride, dicanoladimethylammonium chloride, di(hard)tallowdimethylammonium chloride dicanoladimethylammonium methylsulfate, 1-methyl-1-stearoylamidoethyl-2-stearoylimidazolinium methylsulfate, 1-tallowylamidoemyl-2-tallowylimidazoline, dipalmethyl hydroxyethylammoinum methosulfate and mixtures thereof.

3. The fabric softening composition of claim 2, wherein the quaternary ammonium compound is an esterquat.

4. The fabric softening composition of claim 3, wherein the esterquat comprises a mixture of monoesterquats, diesterquats, and triesterquats.

5. The fabric softening composition of claim 4, wherein the normalized percentage of monoester compound in said esterquat is from 28% to 34%; the normalized percentage of diester compound is from 55% to 62%, and the normalized percentage of triester compound is from 8% to 14%, all percentages being by weight of the total esterquat weight.

6. The fabric softener composition of claim 1, comprising:

a. an esterquat present in an amount from 1% by wt. to 5% by wt., relative to the total weight of the composition;

b. polyquaternium-7 present in an amount from 0.1%-0.75% by wt. of the total composition;

c. a phosphonic chelating agent that is etidronic acid present in an amount from 0.05% to 0.25% by wt. of the total composition; and d. water.

7. The fabric softener composition of claim 1, wherein the cationic polyquaternium polymer is selected from: polyquaternium-1, polyquaternium-2, polyquaternium-3, polyquaternium-4, polyquaternium-5, polyquaternium-6, polyquaternium-7, polyquaternium-8, polyquaternium-9, polyquaternium-10, polyquaternium-11, polyquaternium-12, polyquaternium-13, polyquaternium-14, polyquaternium-15, polyquaternium-16, polyquaternium-17, polyquaternium-18, polyquaternium-19, polyquaternium-20, polyquaternium-21, polyquaternium-22, polyquaternium-23, polyquaternium-24, polyquaternium-25, polyquaternium-26, polyquaternium-27, polyquaternium-28, and mixtures thereof.

8. The fabric softener composition of claim 7, wherein the cationic polyquaternium compound is polyquaternium-7.

9. The fabric softener composition of claim 1, wherein the cationic polyquaternium compound is present in an amount from 0.1%-0.3% by wt. of the total composition.

10. The fabric softener composition of claim 1 further comprising phosphonic acid.

11. The fabric softener composition of claim 1 wherein lactic acid is present from 0.11% to 0.25% by weight of total composition.

12. The fabric softener composition of claim 1, wherein the preservative system comprises lactic acid and 3-iodo-2-propynyl butylcarbamate.

13. The fabric softener composition of claim 12, wherein the ratio of 3-iodo-2-propynyl butylcarbamate:lactic acid is present in a weight ratio of 2:1, based on the total weight of the composition.

14. The fabric softener of claim 1, wherein the preservative system comprises lactic acid and Dodecylguanidine hydrochloride (DGH).

15. The fabric softener composition of claim 1, wherein the phosphonic chelating agent is etidronic acid.

16. The fabric softener composition of claim 1, wherein the fabric softener comprises:

i. an esterquat present in an amount 1% by wt. to 5% by wt., relative to the total weight of the composition;

ii. polyquaternium-7 present from 0.1%-0.75% by wt. of the total composition;

iii. etidronic acid present in an amount from 0.05%-0.25% by wt. of the total composition; and iv. water.

17. The fabric softener composition of claim 1, wherein the preservative system comprises lactic acid and 3-iodo-2-propynyl butylcarbamate, and the preservative system is effective at reducing or preventing the growth of acidophilic bacteria relative to a control sample which does not contain 3-iodo-2-propynyl butylcarbamate.

18. The fabric softener composition of claim 17, wherein the preservative system specifically targets an acetic acid bacterium selected from: *Acetobacter cerevisae, Acetobater aceti, Gluconobacter oxydans, Gluconacetobacter liquefaciens*, and combinations thereof.

19. A method of manufacturing the fabric softener composition of claim 1, wherein the method comprises the post-manufacturing addition of IPBC or DGH into a finished fabric softening product, and wherein the addition of IPBC or DGH does not alter stability and appearance of the finished fabric softening product.

* * * * *